United States Patent [19]

Fischer

[11] 4,001,965
[45] Jan. 11, 1977

[54] CONNECTOR FOR USE WITH STRUCTURAL-FOAM ELEMENTS

[76] Inventor: Artur Fischer, Altheimer Str. 219, D-7241 Tumlingen, Germany

[22] Filed: Aug. 8, 1974

[21] Appl. No.: 495,842

Related U.S. Application Data

[63] Continuation-in-part of Ser. No. 487,806, July 11, 1974, Pat. No. 3,960,460.

[30] Foreign Application Priority Data

Sept. 5, 1973 Germany .......................... 2344713

[52] U.S. Cl. .......................................... 46/23; 46/26
[51] Int. Cl.² ...................................... A63H 33/08
[58] Field of Search ............... 46/16, 17, 23, 26, 28, 46/29; 85/27, 23; 151/68

[56] References Cited

UNITED STATES PATENTS

| 344,683 | 6/1886 | Shener .................................. 85/27 |
| 839,633 | 12/1906 | Parsons ............................. 85/27 UX |
| 1,062,235 | 5/1913 | Henry ................................... 151/68 |
| 1,095,626 | 5/1914 | Dinger et al. ........................... 85/23 |
| 1,243,367 | 10/1917 | Widmer ............................. 85/27 UX |
| 1,255,108 | 1/1918 | Roberts .................................. 85/27 |
| 1,413,489 | 4/1922 | Peterson ................................ 85/27 |
| 2,996,832 | 8/1961 | Rubin .................................... 46/16 |
| 3,036,478 | 5/1962 | Scott et al. ......................... 85/27 X |

FOREIGN PATENTS OR APPLICATIONS

| 401,039 | 3/1909 | France .................................. 85/27 |
| 4,472 | 3/1892 | United Kingdom .................. 85/27 |
| 22,259 | 11/1895 | United Kingdom .................. 85/27 |

*Primary Examiner*—F. Barry Shay
*Attorney, Agent, or Firm*—Michael J. Striker

[57] ABSTRACT

A substantially flat first member is provided with holes and is adapted to be pushed into a structural-foam element. A second member is also adapted to be pushed into the structural-foam element, transversely of the first member and through one of the holes therein, so as to anchor the first member in the structural-foam element.

9 Claims, 2 Drawing Figures

CONNECTOR FOR USE WITH STRUCTURAL-FOAM ELEMENTS

CROSS-REFERENCE TO RELATED APPLICATIONS

The present application is a continuation-in-part of my earlier-filed copending application Ser. No. 487,806 entitled "CONNECTOR FOR ELEMENTS MADE OF STRUCTURAL FOAM, AND METHOD OF CONNECTING SUCH ELEMENT", and filed on July 11, 1974, now U.S. Pat. No. 3,960,460.

BACKGROUND OF THE INVENTION

The present invention relates generally to the connection of elements which are made of structural foam, and in particular to a connector for effecting such a connection.

Elements made of "structural foam" are becoming increasingly more popular. The term structural foam refers to synthetic plastic foam material of the rigid or near-rigid type, of which the material available under the tradename "Styrofoam" is an example.

One area where this particular type of structural foam-element, so-called because it is possible to make structures of it, such as building elements and the like, is in wide use, and with respect to which the invention will hereafter be explained, is in the toy industry. The use of structural foam materials to simulate landscapes, buildings and the like, is widely customary in the toy industry in recent years. When it was necessary heretofore to connect such elements with one another, this was done by means of an adhesive. However, especially in the case of toy structures it is usually desired that a playing child be able to disassemble the elements repeatedly, so that they may be reassembled in many ways according to the child's particular wishes and imagination. The difficulty with this has always been heretofore that if two of these structural-foam elements are connected by means of an adhesive, they cannot subsequently be separated without doing damage to them. For example, if several structural elements have been adhesively connected to make up a simulated landscape arrangement, they cannot be later separated, for instance for detaching a mountain from a base to move it to another location. It is self-evident that under these circumstances a child will either quite rapidly lose interest since it is not possible to convert the set-up from one arrangement to another one, or that it is necessary to supply the child with an extremely large number of different structural elements made of foam material, so that every time the child wishes to change around the arrangement but cannot do so because the previously employed structural-foam elements are adhesively connected together, he can erect a new arrangement by using new structural-foam elements. It is evident that neither of these two solutions is satisfactory.

SUMMARY OF THE INVENTION

Therefore, it is a general object of this invention to overcome the disadvantages of the prior art.

More particularly, it is an object of the present invention to provide an improved connector which makes it possible to effect with ease a releasable connection between two or more structural-foam elements.

Another object of the invention is to provide such a connector which permits a connection to be made in such a manner that the connected structural-foam elements are firmly secured to one another, including against reasonable tensile stresses—the term "reasonable" referring to such stresses which will not damage the material of the structural-foam elements per se—but which can be released without doing more than at most very slight damage to the material of the elements.

In keeping with these objects, and with others which will become apparent hereafter, one feature of the invention resides in a connector for use with structural-foam elements which, briefly stated, comprises a substantially flat first member provided with holes and being adapted to be pushed into a structural-foam element. A second member is also adapted to be pushed into a structural-foam element, to extend transversely of the first member through one of the holes thereof, so as to anchor the first member in the structural-foam element but in a releasable manner.

Either or both of the first and second members can be made of synthetic plastic material themselves, for instance of polyurethane, nylon or the like, and can in fact be produced very readily and inexpensively by injection molding. The first member, when it is to be used for establishing a connection, is placed against the surface of a structural-foam element so that it extends substantially normal to the surface, and pushed into the foam element. Because the first member is flat in configuration, it readily enters into the material of the structural-foam element, cutting through this material wihtout causing any crumbling of the same as would be the case if a blunt object were to be pushed into the same material. This is important because crumbling causes a loss of the inherent elasticity of the material which is one of the primary factors relied upon for retaining the inserted first element tightly in the structural-foam element. Thereupon, the second member is also pushed into the structural-foam element so that it passes through one of the holes in the first member, thereby reliably anchoring the latter in the foam element. If the first member is inserted into the foam element in the region of an edge thereof, then the second member can be pushed through a hole of the first member normal or substantially normal to the latter; otherwise, the second member must be inserted at an angle to the plane of the first member. Since the first member is provided with several holes, it is always possible to find at least one of them through which the second member can be pushed.

The invention is particularly suitable in connection with toy model kits and the like, for example for erecting simulated landscapes or the like, which can be subsequently be taken apart again so that their structural-foam elements can be re-assembled in a different manner. Moreover, the first member can be provided with one or more appropriate connecting portions so that these latter can be used to secure to a structural-foam element in which the first member is anchored, other components that can be connected with the connecting portions, for instance components which are not made of structural foam.

The opposite open ends of the holes in the first member may be enlarged in a substantially funnel-shaped configuration to facilitate insertion of the second member into them.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
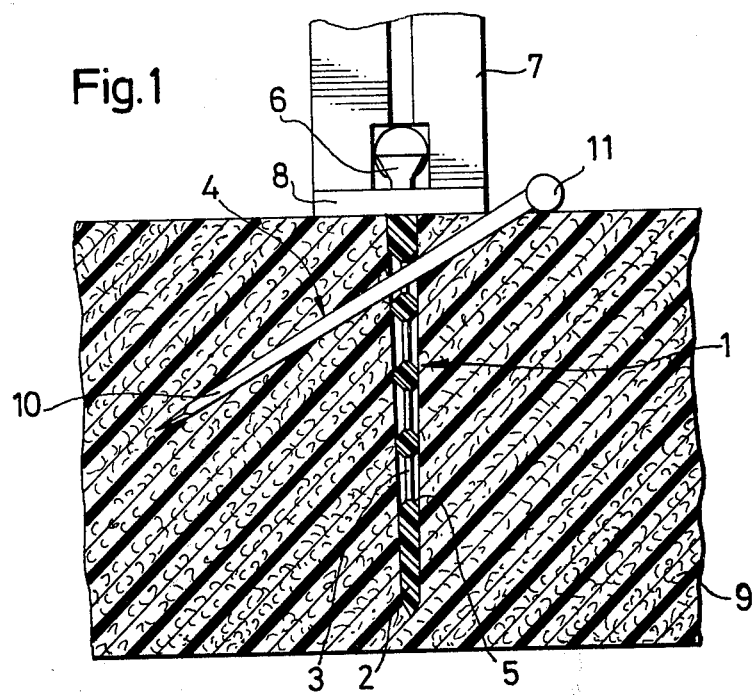
FIG. 1 is a sectional view, illustrating a connector according to the present invention inserted into a fragmentarily shown structural-foam element, and having another component connected to it.
Figure 2:
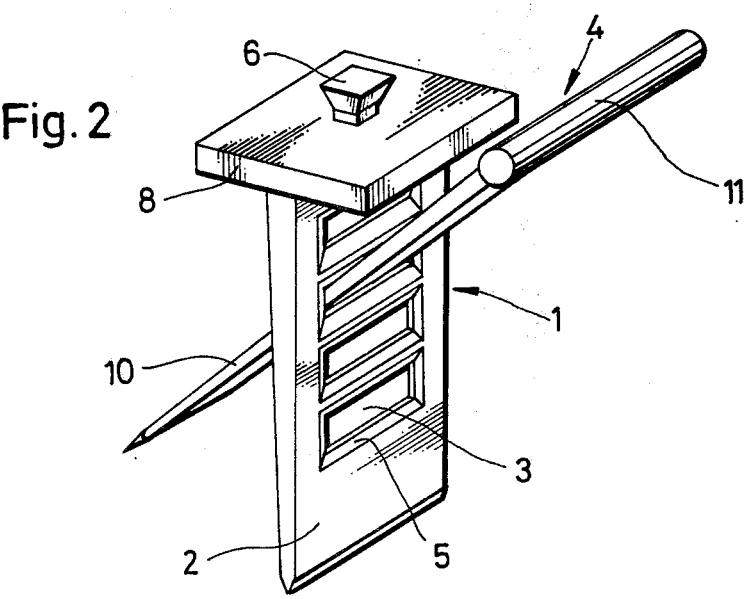
FIG. 2 is a perspective view of the connector shown in FIG. 1.

Referring to FIGS. 1 and 2 now in detail, it will be seen that the connector per se is identified with reference numeral 1. It has a first member 2 which is substantially planar and flat and provided with a plurality of holes 3. To facilitate insertion of the second member 4 which serves to anchor the first member 2 in a structural-foam element 9 which is diagrammatically and fragmentarily shown in FIG. 1, the opposite open ends of the holes 3 are substantially funnel-shaped or outwardly divergent. The configuration of the holes 3 could be different from what has been illustrated, as will be self-evident.

An abutment flange 8 is provided at the trailing end of the member 2, that is the end which is located outwardly or adjacent to the exposed surface of the element 9 when the member 2 is inserted into the same; the flange 8 serves to limit the extent to which the member 2 can be pushed into the element 9. In the illustrated embodiment the flange 8, which could also be omitted, carries a coupling portion 6, here illustrated as a male coupling head of undercut cross-sectional configuration. The purpose of this is to permit connection to the structural-foam element 9 of another component, which by way of example is illustrated in FIG. 1 as a toy building block 7 which is formed with one or more (not shown) matingly undercut grooves in which the coupling head 6 can be received, so as to retain the block 7 on the structural-foam element 9.

In order to prevent accidental or undesired withdrawal of the member 2 from the foam element 9, the second member 4 is provided having an elongated shaft 10 the cross-sectional configuration of which corresponds in the illustrated embodiment to that of the holes 3. The shaft 10 is also pushed into the material of the structural-foam element and made to pass through one of the openings 3, as shown in FIG. 1, so as to anchor the member 2 reliably. The shaft 10 is provided with a tip and resembles a knife blade in its configuration, in order to facilitate its insertion into the element 9. The extent to which it can be so inserted is limited by providing its trailing end with a transversely extending portion 11 resembling the cross bar of the letter T, and which in the illustrated embodiment is of cylindrical configuration. Its configuration could evidently be different, and the portion 11 might be provided with (or be replaced by) a coupling head similar to the coupling head 6.

One or both of the members 2 and 4 can be made of synthetic plastic material, for instance by injection molding or the like.

The use of the coupling head 6, or of an analogous coupling portion on one or both of the members 2, 4, makes it possible to connect at the will of a child a variety of different building blocks 7 or similar components to a structural-foam element. For instance, if one or more structural-foam elements are used to assemble a landscape, the connector according to the present invention might be anchored in one of these and a tower or other structure of building blocks 7 or the like could be connected to this structural-foam element landscape by means of one or more of these connectors, via their heads 6 or analogous coupling portions. The tower or other structures could then be readily exchanged or modified, at the will of a playing child.

The portion 11 on the member 2 could be of different configuration than illustrated, as pointed out before. Its cylindrical configuration, however, has the advantage that it can be readily pushed into the inherently yieldable structural foam material of the element 9—such material even if rigid or semi-rigid yield to a certain extent—so that the portion 11 can actually be recessed into this surface and no part of the connector will project outwardly beyond the surface. Because of the cylindrical configuration of the portion 11 this recessing will result only in the formation of a depression in the surface of the element 9, but not in damage or destruction to the material of the element 9.

It will be understood that each of the elements described above, or two or more together, may also find a useful application in other types of constructions differing from the types described above.

While the invention has been illustrated and described as embodied in a connector for use with structural-foam elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A connector for connecting elements of a toy construction kit to structural-foam elements, conprising a first elongated member having a first portion provided with a substantially flat blade-shaped leading end adapted to cut a slit-like incision in a structural-foam element when said first portion is pushed therein and with a trailing portion, said first portion being provided with a plurality of holes spaced in the direction of said elongation from each other and respectively extending transversely to said direction in substantially parallel planes, said first member further having at said trailing end a second portion of a shape adapting it to serve as a stop when said first portion is pushed into said structural-foam element; a connecting element provided on said second portion and, when said first portion is pushed into a structural-foam element, being accessible at the exterior thereof for connection to a cooperating connecting portion of an element of a toy construction kit; a second member having a second substantially flat blade-shaped portion adapted to cut a slit-like incision in said structural-foam element when said second member is pushed therein transversely of said first member and to pass through any of said holes, so as to anchor said first member in said structural-foam element without causing crumbling of the material of the latter.

2. A connector as defined in claim 1, wherein said holes have inlet ends which taper in direction inwardly of the respective hole so as to facilitate entry of said second member.

3. A connector as defined in claim 1, wherein said holes are of rectangular configuration for receiving the substantially flat blade-shaped portion of said second member.

4. A connector as defined in claim 1, wherein said connecting element is a male coupling head of undercut cross-section which is adapted for insertion into a groove of complementary cross-section.

5. A connector as defined in claim 1, wherein at least one of said members is of synthetic plastic material.

6. A connector as defined in claim 1, wherein said second portion of said first member comprises an abutment flange at a juncture of said first blade-shaped element and said connecting portion for limiting the penetration of said first blade-shaped portion into said structural-foam element.

7. A connector as defined in claim 1, said second member further comprising an abutment part which limits the insertion of said second blade-shaped portion into said structural-foam element.

8. A connector as defined in claim 7, wherein said abutment part extends transverse of the elongation of said second blade-shaped portion.

9. A connector as defined in claim 8, wherein said abutment part is of cylindrical shape.

* * * * *